Aug. 6, 1968    D. E. ROACH    3,395,725
COMBINATION BALL CHECK AND NEEDLE VALVE
Filed Oct. 18, 1965

INVENTOR.
DONALD E. ROACH
BY
McNENNY, FARRINGTON, PEARNE & GORDON
ATTORNEYS

United States Patent Office 3,395,725
Patented Aug. 6, 1968

3,395,725
COMBINATION BALL CHECK AND
NEEDLE VALVE
Donald E. Roach, Port Huron, Mich., assignor to Mc-
Dowell-Wellman Engineering Co., Cleveland, Ohio, a
corporation of Ohio
Filed Oct. 18, 1965, Ser. No. 497,336
5 Claims. (Cl. 137—512.15)

ABSTRACT OF THE DISCLOSURE

A combination ball check and needle valve for controlling the rate of flow in one direction including a valve body formed with a longitudinal guide passage, a cylindrical metering stem axially movable in the guide passage, and a poppet guided for movement along the metering stem and spring biased to seal with a valve seat. The metering stem is provided with a longitudinal passage open to the lateral surface of the stem. The poppet is formed with a pressure actuated lip seal end adapted to cooperate with the lateral opening and adjustably restrict the flow through the assembly in one direction. A positive pressure gradient across the valve assembly in the opposite direction will cause the poppet to be axially displaced against the spring bias and provide substantially unrestricted flow in that direction. The biasing spring further serves to hold the poppet on the metering stem prior to assembly, and to lock the metering stem in the valve body.

This invention relates generally to flow control valves and more particularly to a novel and improved valve assembly combining within the single assembly an adjustable metering valve and a check valve.

A valve assembly incorporating this invention provides an adjustable flow restriction controlling flow past the assembly in one direction and a check valve permitting substantially unrestricted flow through the assembly in the opposite direction. The assembly may be used in any hydraulic circuit requiring metered flow in only one direction and is illustrated installed in a piston and cylinder actuator provided with hydraulic cushioning at the end of its stroke.

The preferred form of this invention is constructed and arranged to provide a low cost dependable assembly which can be easily, quickly, and economically installed in the associated system and which provides accurate and easy adjustment of the degree of flow restriction.

The illustrated embodiment of this invention provides a single assembly including a body adapted to be mounted in a threaded opening in the associated equipment opposite a valve seat. A metering stem is mounted on the body and is adjustable in a direction toward and away from the valve seat. A valve poppet adapted to engage the seal with the valve seat is guided for movement along the metering stem and is biased in a direction toward the valve seat by a light spring. When the assembly is installed the spring normally maintains the valve poppet in sealing engagement with the valve seat. Therefore, the valve poppet is normally in a predetermined position relative to the body.

The metering stem is provided with a longitudinal slot or passage open to the lateral surface of the metering stem. The poppet partially closes the lateral opening of the slot so that the relative position between the metering stem and the valve poppet determines the size of the restricted flow path through the valve seat. The adjustment of the metering stem relative to the body, and in turn relative to the valve poppet, provides adjustment of the flow restriction provided by the installed assembly. When fluid under pressure is present on the side of the valve seat remote from the body the valve poppet is lifted away from the seat against the action of the spring and substantially unrestricted flow is permitted.

The spring for the valve poppet and the associated elements is proportioned and arranged so that the spring locks the metering stem in the main body and also prevents the valve poppet from sliding off the end of the metering stem prior to the installation of the assembly. Therefore, the single spring performs three separate and distinct functions. It holds the metering stem in the assembled position, it holds the valve poppet on the assembly and it also biases the valve poppet toward the seated position when the assembly is installed.

The shape of the valve poppet is also another feature of this invention. The poppet is provided with a main section having a generally spherical outer surface, adapted to engage and seal with the valve seat in a reliable manner, and a lip seal portion extending along the metering stem. The lip seal is pressure actuated to seal with the exterior surface of the metering stem and prevent leakage between the metering stem and the valve poppet. This lip seal portion terminates at an edge which cooperates with the axial slot or passage in the metering stem to produce the adjustable orifice.

It is an important object of this invention to provide a novel and improved valve assembly combining a metering valve with a check valve wherein the assembly is economical to produce, easy to install, and provides reliable substantially trouble free operation.

It is another important object of this invention to provide a novel and improved valve assembly combining a valve poppet and metering element cooperating in one condition of operation to produce an adjustable flow restriction and cooperating in another condition of operation to provide substantially unrestricted flow.

It is another important object of this invention to provide a novel and improved valve assembly combining an adjustable flow restrictor and check valve wherein a single spring performs the functions of securing a metering stem in the body, holding the valve poppet on the metering stem, and also biasing the valve poppet toward its normal closed position when the assembly is installed in the associated equipment.

It is still another object of this invention to provide a novel and improved valve assembly having a metering stem formed with longitudinal slots open to an exterior surface in a metering stem which openings cooperate with a check valve poppet around the metering stem to provide an adjustable flow restriction.

Further objects and advantages will appear from the folowing description and drawings wherein.

Figure 1:
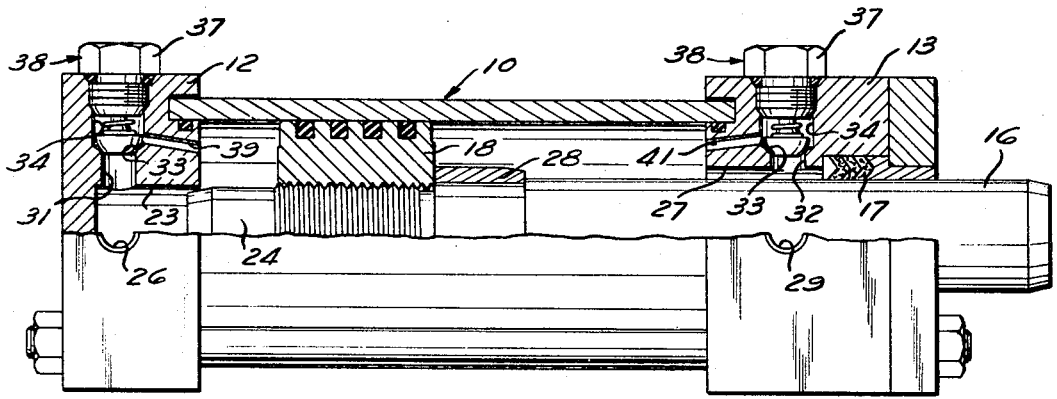
FIGURE 1 is a side elevation partially in section illustrating a preferred form of valve assembly incorporating this invention installed in a piston and cylinder actuator in which the piston is hydraulically cushioned as it approaches the ends of its stroke.

The actuator illustrated in FIGURE 1 includes a cylinder assembly 10 closed on one end by a first end plate 12 and on the other end by a second end plate 13. A piston 16 extends through a seal 17 in the end plate 13 and is threaded to receive a piston head 18 which seals in the usual manner with the inner surface of the cylinder assembly.

The end plate 12 is provided with a central axial bore 23 proportioned to receive and closely fit an end projection 24 on the piston 16 as the piston approaches the left extreme of its travel. A port 26 formed in the end plate 12 is open to the bore 23 at a point spaced from the inner face of the end plate. Similarly, the end plate 13 is formed with a bore 27 proportioned to receive and closely fit a cushion ring 28 which enters the bore 27 when the piston 16 approaches its extended extreme position. Here again, a port 29 is formed in the end plate 13 open to the bore 27.

The end plates 12 and 13 are also formed with lateral bores 31 and 32, respectively, extending from the associated bores 23 and 27 to a valve seat 33. Radially beyond the valve seat 33 the end plates 12 and 13 are each provided with an enlarged bore 34 threaded at 36 to receive a body 37 of a valve assembly 38. An axially extending passage 39 and 41 is formed in each of the end plates 12 and 13, respectively, to provide a flow connection between the bores 34 and the adjacent ends of the cylinder 10.

In a typical installation the ports 26 and 29 are connected to the controlled ports of a four-way valve so that fluid under pressure can be supplied to a selected one of the ports 26 and 29 while the other port is connected to exhaust. When extension of the piston 16 is required fluid under pressure is supplied to the port 26 while the port 29 is connected to exhaust. Conversely when retraction of the piston 16 is required the port 29 is connected to a source of fluid under pressure and the port 26 is connected to exhaust.

Assuming now that the port 26 is pressurized, the port 29 is connected to exhaust, and the piston is in the position illustrated with the projection 24 substantially clear of the walls of the bore 23, fluid under pressure flowing into the port 26 flows along the bore 23 into the left end of the cylinder producing movement of the piston 16 to the right. The fluid contained in the right end of the cylinder flows, unrestricted, out along the bore 27 and through the port 29 until the cushioning ring 28 enters the bore 27 and prevents flow along the bore 27 to the port 29.

As soon as the cushion ring 28 prevents free flow of fluid along the bore 27 the pressure in the right end of the cylinder starts to raise. A restricted path is then provided through the bore 41 past the valve assembly 38 and along the bore 32 to the port 29. Since the flow in this direction is restricted or metered the movement of the piston toward the extended extreme position is resisted by the increased pressure in the right end of the cylinder and the velocity of the piston reduces. The degree of cushioning provided is a function of the flow restriction provided by the valve assembly.

When the piston 16 is in its extended extreme position and it is desired to initiate its movement toward the retracted position pressure is supplied to the port 29 and the port 26 is connected to exhaust. At this time the cushion ring 28 prevents substantial flow along the bore 27 and would prevent rapid movement of the piston during the initial portion of the stroke if a bypass were not provided. Therefore, the valve assembly 38 is arranged so that when the pressure in the bore 32 exceeds the pressure in the passage 41 the valve assembly opens to provide substantially unrestricted flow between the port 29 and the passage 41. Therefore, the piston 16 rapidly commences to move toward the retracted position even though the cushion ring 28 substantially closes the bore 27. The flow through the valve assembly continues until the cushion ring 28 leaves the bore 27 at which time flow occurs directly out along the bore 27 to the right end of the cylinder.

As the piston approaches its fully retracted position the projection 24 enters the bore 23 and cushioning is produced by the flow restriction of the valve assembly 38 in the end plate 12 in the same manner discussed above. Here again, when pressure is supplied through the port 26, and the piston is in the left or retracted extreme position, the valve assembly 38 in the end plate 12 provides a bypass which is substantially unrestricted so that the extension of the piston is not delayed.

The valve assemblies 38 in each of the end plates 12 and 13 are identical in structure so only the valve assembly 38 on the end plate 12 will be discussed in detail with the understanding that structural description applys equally to the valve assembly 38 mounted in the end plate 13.

Figures 2, 4:
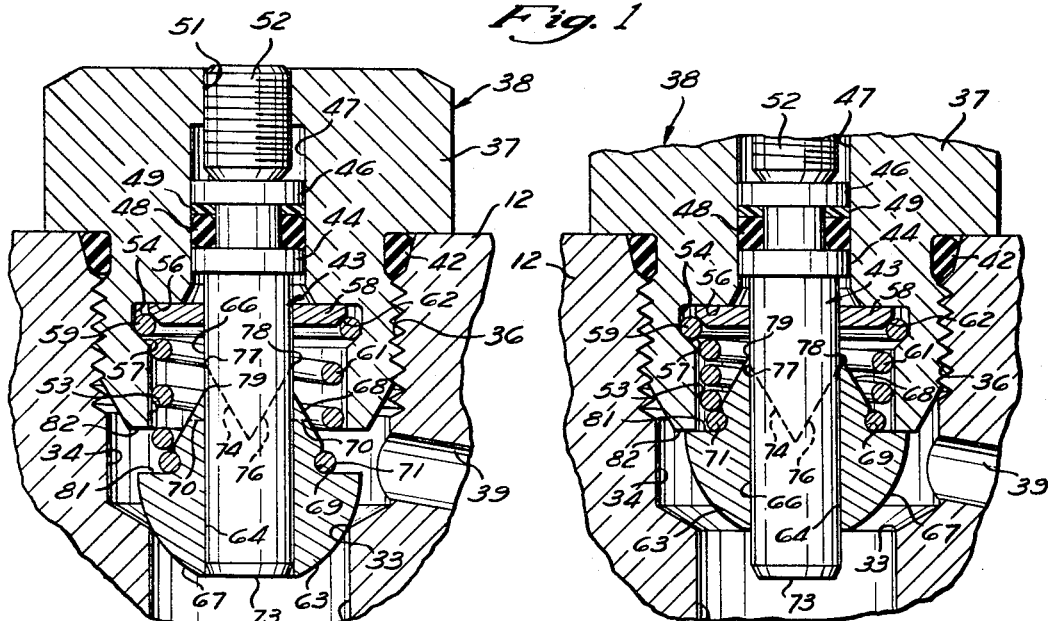
FIGURE 2 is an enlarged longitudinal section of the valve assembly illustrating the structural detail thereof.
FIGURE 4 is a fragmentary view, similar to FIGURE 2, illustrating the valve assembly when the poppet is lifted away from the valve seat to provide substantially unrestricted flow past the assembly; and, FIGURE 5 is a longitudinal section of a valve assembly installed in a general use fitting which may be used in substantially any type of fluid flow circuit.

Referring now to FIGURE 2, the valve body 37 is threaded into the threaded portion 36 of the bore 34 to mount the assembly in the end plate 12. A seal 42 prevents leakage out along the threads. A metering stem 43 is provided with spaced shoulders 44 and 46 which closely fit into a central bore 47 formed in the body 37. A seal 48 of the O-ring type is positioned around the metering stem 43 between the shoulders 44 and 46 along with a backup ring 49 to provide a seal between the metering stem and the walls of the bore 47. This seal prevents leakage out along the bore 47 while permitting axial movement of the metering stem 43 relative to the body 37 along the bore 47.

The body 37 is formed with threads at 51 to receive a set screw 52 which engages the outer end of the metering stem 43 adjustably limit the position of the metering stem 43 relative to the body 37. This structure eliminates problems in close tolerances as to concentricity between the threads 51 and the bore 47. Inwardly of the bore 47 the body 37 is formed with an enlarged bore 53 extending to the opposite end of the body 37 and an annular groove 54 adjacent a radial wall 56. A conical surface 57 extends between the annular groove 54 and the bore 53.

A washer 58 is positioned against the end face 56 by the end 59 of a spring 61. The washer 58 is formed with a chamfer 63 substantially parallel to the conical surface 57 and spaced therefrom a distance substantially equal to the diameter of the wire forming the spring 61. With this structure an axial inward force on the washer 58 is resisted by the positive locking action of the end 59 of the spring 61, so the washer is locked in place. The washer 58 is proportioned to engage a shoulder 44 and limit the inward or downward movement of the metering stem 43.

A valve poppet 63 is formed with a central opening 64 proportioned to closely fit the cylindrical outer surface 66 of the metering stem 43. The lower end of the poppet 63 is formed with a generally spherical surface 67 adapted to engage and seal with the valve seat 33. The upper end of the poppet 63 is formed with a tapered portion 68 terminating at a relatively sharp edge at its junction with the central opening 64. This tapered portion acts as a lip seal to inure sealing with the surface 66 of the metering stem 43 when the pressure in the bore 34 exceeds the pressure in the bore 31 to prevent any leakage between the metering stem 43 and the valve poppet. Intermediate the tapered portion 68 and the spherical end 67 the valve poppet 63 is formed with an outwardly facing annular groove 69 adapted to receive the end turn 71 of the spring 61.

When the valve assembly is to be used in high pressure hydraulic systems the poppet 63 is preferably formed of stainless steel or other suitable metal. However, when the valve assembly is to be used in lower pressure hydraulic systems or lower pressure pneumatic systems the poppet 63 may be formed of a plastic material. In some instances a composite poppet is formed by using metal for the portion of the poppet below the line 70 (illustrated in FIGURE 2) and plastic for the lip seal portion above the line 70. In such composite poppets a plastic such as Teflon or hard buna N rubber is bonded to the metal and insures that sufficient deflectability is present to produce a good seal.

The metering stem 43 is formed with an axially extending slot 72 which extends laterally across the metering stem 43 adjacent to the inner end 73. The slot extends to opposed and similar inclined walls 74 and 76 which join with the lateral surface 66 at 77 and 78, respectively. Thus, the slot 72 forms openings in the lateral wall 66 on each side of the metering stem 43 extending to the points 77 and 78. These openings are closed to a large extent by the valve poppet 63 so that the end 79 of the tapered portion 68 of the valve poppet 63 cooperates with the slot to define a restrictive orifice on each side of the metering stem 43. The size of the orifices are determined by the relative axial position between the metering stem 43 and the valve poppet 63.

When the valve assembly functions to restrict or meter flow the valve poppet 63 is held against the seat 33 by the pressure in the bore 34 and the force of the spring 61. At the same time the pressure in the bore 34 produces an axially outward force on the metering stem 43 which holds it in a fixed position against the set screw 52. Consequently, during metering the valve poppet 63 and the metering stem 43 are in a predetermined position determined by the adjusted position of the set screw 52.

When more restriction is required the set screw 52 is threaded into the body 37 reducing the uncovered area of the slot 72 above the end 79 of the valve poppet 73. When less restriction is required the set screw 52 is threaded outwardly allowing the valve stem 43 to move axially relatively to the poppet to an adjusted position wherein the larger area of the slot 72 is open and less flow restriction is provided. Therefore, adjustment of the set screw 52 provides adjustment of the position of the metering stem 43 and, in turn, adjustment of the amount of restriction provided.

When the pressure in the bore 31 exceeds the pressure in the bore 34 the force of the spring 61 is overcome and the valve poppet 63 lifts away from the seat 33 to provide a substantially unrestricted flow connection between the bore 31 and the passage 39. During this time the lateral opening of the slot 72 may be closed, but this does not affect the operation of the assembly. A radial surface 81 on the valve poppet 63 engages an end wall 82 on the body 37 when the valve poppet is opened to limit the opening travel of the poppet 63 and prevent permanent distortion of the spring 61. The spring 61 is preferably a very light spring so that relatively small pressure differentials will produce opening or lifting of the poppet 63 when the pressure in the bore 31 exceeds the pressure in the bore 34.

Because the upper end or outer end 59 of the spring 61 locks the washer 58 and, in turn, the metering stem 43 in position and because the end 71 of the spring 61 extends into the annular groove 69 the assembly will remain in the assembled condition, even when the valve assembly 38 is not installed, because the spring 61 is placed in tension with sufficient force to prevent the poppet 63 from falling off the end 73 of the metering stem 43. Therefore, the spring 61 serves the function of locking the valve assembly in the assembled condition and also insuring that the valve poppet 63 is normally maintained against the valve seat 33 when the valve assembly is installed.

Figure 5:
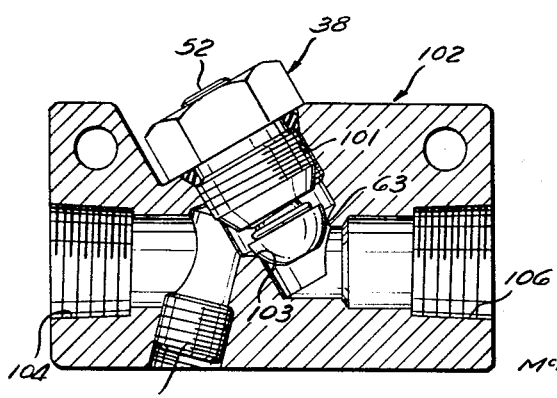
Figure 3:
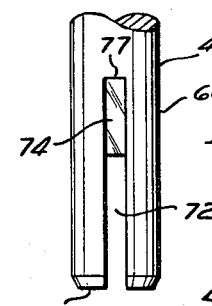
FIGURE 3 is a fragmentary view of the metering stem illustrating the longitudinal slot.

Referring now to FIGURE 5, the valve assembly 38 may be mounted in a threaded opening 101 in a fitting 102 so that its poppet 63 engages a valve seat 103. The fitting is formed with a threaded opening 104 connected to one side of the valve seat in a second threaded opening 106 connected to the other side of the valve seat 103. If desired, a drain port 107 may also be provided. The fitting 102 may be coupled by typical hose or tube fittings into any desired system and when so installed the valve assembly 38 functions in the same manner as in the structure illustrated in FIGURE 1. Flow of fluid under pressure in through the opening 104 toward the opening 106 is restricted while flow in the opposite direction is substantially unrestricted. Here again, adjustment of the set screw 52 provides adjustment of the degree of the flow restriction.

The valve assembly incorporating this invention combines in a single assembly an adjustable metering valve and a check valve so that a single valve seat and a single threaded opening with associated passages accommodates both the check valve and metering valve structure. Therefore, it is merely necessary to install a single assembly in the associated equipment to provide both valving functions. In addition, the metering function is provided by the elements of the valve assembly so that it is not necessary to accurately form a valve seat as it would be if a typical needle valve structure were used.

Although preferred embodiments of this invention are illustrated, it is to be understood that various modifications and rearrangements of parts may be resorted to without departing from the scope of the invention as defined in the following claims.

I claim:

1. A valve assembly comprising a valve body formed with a longitudinal guide passage, an elongated metering stem guided in said guide passage for longitudinal movement therealong, means adjustably limiting movement of said metering stem along said guide passage in one direction, a radially extending face on said metering stem facing a direction generally opposite said one direction, a washer around said stem adapted to engage said radial extending face and limit movement of said stem in a direction opposite said one direction, said washer and body being formed with opposed radially extending surfaces, a spring positioned between said opposed surfaces preventing movement of said washer in said opposite direction, and a poppet adapted to seal with a valve seat guided for movement along said metering stem, said stem and poppet cooperating to form a restricted flow passage the restriction of which is determined by the relative position of said poppet and said stem.

2. A valve assembly comprising a valve body formed with a longitudinal guide passage, an elongated metering stem guided in said guide passage for longitudinal movement therealong, means limiting movement of said metering stem along said guide passage in one direction, a radially extending face on said metering stem facing a direction generally opposite said one direction, a washer around said stem adapted to engage said radial extending face and limit movement of said stem in a direction opposite said one direction, said washer and body being formed with opposed radially extending surfaces, one end of a spring positioned between said opposed surfaces preventing movement of said washer in said opposite direction, a poppet adapted to seal with a valve seat guided for movement along said metering stem and formed with a radially facing annular groove, the other end of said spring being positioned in said annular groove, said stem and poppet cooperating to form a restricted flow passage the restriction of which is determined by the relative position of said poppet and said stem.

3. A valve assembly comprising a valve body formed with a longitudinal guide passage, an elongated metering stem guided in said guide passage for longitudinal movement therealong, means adjustably limiting movement of said metering pin along said guide passage in one direction, a radially extending face on said metering stem facing a direction generally opposite said one direction, a washer around said stem adapted to engage said radially extending face and limit movement of said stem in a direction opposite said one direction, said washer and body defining a space therebetween receiving one end of a spring for preventing movement of said washer in said opposite direction and for locking said spring against withdrawal from said stem, and a poppet adapted to seal with a valve seat guided for movement along said metering stem, the other end of said spring gripping said poppet to prevent withdrawal thereof from said stem in said opposite direction, said spring being adapted to normally maintain said poppet in engagement with the valve seat.

4. A valve assembly comprising an elongated metering stem, a valve poppet guided along said metering stem adapted to engage and seal with a valve seat when in one position, a first means operable to normally maintain said poppet in said one position, a second means operable to adjustably position said metering stem relative to said poppet when said poppet is in said one position, a longitudinal passage in said metering stem open at one end through said poppet and at the other end open to the lateral surface of said metering stem, said poppet being formed with a tapered resilient cylindrical projection of small cross section extending along said lateral surface of said metering stem and terminating in a sharp edge, said projection providing substantially no frictional resistance to the movement of said metering stem when the fluid pressure thereabout is relatively low and said projection being adapted to be deflected by relatively high pressure fluid to interengage said lateral surface of said metering stem and to cooperate with said lateral opening of said passage to define a restricted flow passage the restriction of which is determined by the relative position of said poppet and said metering stem, said poppet being movable away from said seat along said metering stem permitting substantially unrestricted flow when fluid pressure on one side of said seat exceeds fluid pressure on the other side of said seat.

5. A valve assembly comprising a valve body, a valve seat, an elongated metering stem, a valve poppet guided along said metering stem engaging and sealing with said valve seat when in one position, spring means operable to normally maintain said poppet in said one position, a first end of said spring means being anchored to said body and a second end of said spring means being anchored to said poppet to hold said poppet on said metering stem prior to assembly of said valve assembly, means operable to adjustably position said metering stem relative to said valve seat, said poppet and said metering stem cooperating to define a restricted flow passage past said valve seat the restriction of which is changed by said adjustment of said metering stem, said poppet being movable away from said seat along said metering stem permitting substantially unrestricted flow when fluid pressure on one side of said seat exceeds the fluid pressure on the other side of said seat, said poppet is formed with a tapered resilient cylindrical projection of small cross section extending along said lateral surface of said metering stem and terminating in a sharp edge, said projection providing substantially no frictional resistance to the movement of said metering stem when the fluid pressure thereabout is relatively low and said projection being adapted to be deflected by relatively high pressure fluid to interengage said lateral surface of said metering stem to define said restricted flow passage.

References Cited
UNITED STATES PATENTS

| | | | |
|---|---|---|---|
| 2,725,076 | 11/1955 | Hansen | 137—543.15 |
| 2,592,656 | 4/1952 | Catranis | 188—96 |
| 2,780,321 | 2/1957 | Sturari | 188—100 |
| 3,122,063 | 2/1964 | Chorkey | 91—26 |

WILLIAM F. O'DEA, *Primary Examiner.*

H. COHN, *Assistant Examiner.*